(12) United States Patent
Suwa et al.

(10) Patent No.: US 7,852,602 B2
(45) Date of Patent: Dec. 14, 2010

(54) COOLING OF HEAD ACTUATOR OF DISK DEVICE

(75) Inventors: Masaya Suwa, Kawasaki (JP); Yoshiharu Matsuda, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 796 days.

(21) Appl. No.: 11/891,272

(22) Filed: Aug. 9, 2007

(65) Prior Publication Data

US 2008/0100967 A1 May 1, 2008

(30) Foreign Application Priority Data

Oct. 31, 2006 (JP) .............................. 2006-296220

(51) Int. Cl.
*G11B 33/14* (2006.01)
(52) U.S. Cl. .................................................. 360/97.02
(58) Field of Classification Search ............. 360/97.01, 360/97.02, 97.03, 97.04
See application file for complete search history.

(56) References Cited

U.S. PATENT DOCUMENTS

| 5,956,203 | A | 9/1999 | Schirle et al. | |
|---|---|---|---|---|
| 7,554,762 | B2* | 6/2009 | Suwa et al. | 360/97.02 |
| 7,616,402 | B2* | 11/2009 | Suwa et al. | 360/97.02 |
| 2004/0252405 | A1* | 12/2004 | Sun et al. | 360/97.02 |

FOREIGN PATENT DOCUMENTS

| JP | 1-319198 | 12/1989 |
|---|---|---|
| JP | 11-110960 | 4/1999 |

* cited by examiner

*Primary Examiner*—Allen T Cao
(74) *Attorney, Agent, or Firm*—Greer, Burns & Crain, Ltd.

(57) ABSTRACT

A magnetic disk device includes a swing-type head actuator which is driven by a voice coil motor. The voice coil motor is cooled by an airflow generated when a magnetic disk accommodated in a disk accommodating unit of an enclosure is rotated by a spindle motor. An airflow dividing member provided on an inner wall or a base of an actuator accommodating unit divides the airflow generated by the rotation of the disk and passing along the inner wall. The divided airflow is introduced to a coil part of the voice coil motor, and cools the coil, without sacrificing the dust purge performance.

11 Claims, 6 Drawing Sheets

COOLING OF HEAD ACTUATOR OF DISK DEVICE

CROSS-REFERENCE TO RELATED APPLICATION

This application claims priority from, and incorporates by reference the entire disclosure of, Japanese Patent Application No. 2006-296220, filed on Oct. 31, 2006.

BACKGROUND OF THE INVENTION

1. Field of the Invention

The present invention relates to a disk device and, more particularly, to a disk device having improved cooling performance and dust purge performance of a driving unit of a head actuator using circulating air generated by the rotation of a magnetic disk, within a magnetic disk device.

2. Description of the Related Art

Conventionally, data of a computer is stored in a main memory of a storage device using a semiconductor element. Because information stored in the main memory disappears when power is not supplied, the data is also stored in an external storage device. In many cases, a magnetic disk device is used for this external storage device. Because of its large storage capacity, a hard disk device, including a data storage disk coated with a magnetic substance and a magnetic head for writing data onto and reading data from this disk, forms the external storage device. The data storage disk includes many disks of aluminum or glass coated with a magnetic substance and superimposed with each other. Data is written onto and read from this data storage disk, by rotating this disk by a motor.

The magnetic disk device has a spindle motor provided inside an enclosure. At least one magnetic disk is fitted to this spindle motor. The magnetic head provided on the head actuator is used to read recorded data from or write data onto the magnetic disk.

The head actuator swings around a rotation axis with a voice coil motor (VCM). The voice coil motor includes a magnet fitted to an upper yoke and a lower yoke, respectively, and a coil located in a magnetic field generated by the magnets. The head actuator swings around the rotation axis, based on a current conducted to the coil.

When the head actuator is made to swing around the rotation axis based on the current conducted to the coil, the coil is heated. Therefore, the coil needs to be cooled. According to a data storage device and a hard disk drive described in JP-A-11-110960, a slot or a groove is formed on a cavity wall of the disk device, or an isolation disk wall having an airflow channel formed therein is inserted (a shroud insert) to guide an airflow generated by the rotation of the disk through this airflow channel, thereby cooling the coil.

However, according to the configuration proposed by the data storage device and the hard disk drive described in JP-A-11-110960, the inflow amount of air is small, and the airflow cannot be efficiently applied to the end of the coil where the coil is heated most. Therefore, this method has a problem in that the effect of cooling the coil is small.

There is also a method of cooling a coil by guiding the airflow generated by the rotation of the disk to a coil part of a voice coil motor, using a shape of a magnetic circuit of the voice coil motor. However, according to this method, an airflow not contributing to the cooling is interrupted, and the amount of the airflow to a circulation filter provided in the downstream decreases. As a result, dust purge performance decreases.

SUMMARY OF THE INVENTION

It is an object of the present invention to provide a disk device having an airflow dividing mechanism that guides air flowing along a wall surface of an enclosure out of an airflow generated by the rotation of a disk, to a coil part of a voice coil motor, and passes the airflow to a gap part between an upper magnet and a lower magnet of the voice coil motor, thereby avoiding sacrificing of dust purge performance, without interrupting an airflow other than the airflow which contributes to cooling of the coil.

In order to achieve the above object, a disk device according to the present invention includes a disk accommodating unit and an actuator accommodating unit inside an enclosure. At least one disk medium rotated by a spindle motor is accommodated in the disk accommodating unit. A rotation actuator assembly that writes data onto and reads data from the disk medium by a head and a voice coil motor that drives the rotation actuator assembly are accommodated in the actuator accommodating unit. An airflow dividing member that divides a part of the airflow generated by the rotation of the disk medium and flowing along the inner wall of the enclosure is provided near a communicating hole that communicates between the inside and the outside of an upper yoke. The airflow dividing member sends the air flowing from the communicating hole to the inside of the upper yoke, thereby cooling the coil of the voice coil motor located within the upper yoke.

According to the present invention, air that flows along the wall surface of the enclosure is guided to the coil part of the voice coil motor, out of the airflow generated by the rotation of the disk within the enclosure. The guided air is passed to a gap part between the upper magnet and the lower magnet of the voice coil motor to cool the coil. With this arrangement, the airflow other than the airflow which contributes to the cooling of the coil is not interrupted. Therefore, the coil of the voice coil motor can be cooled, without sacrificing the dust purge function.

BRIEF DESCRIPTION OF THE DRAWINGS

The present invention is illustrated by way of example, and not limitation, in the figures of the accompanying drawings in which like references indicate similar elements. Note that the following figures are not necessarily drawn to scale.

DESCRIPTION OF THE PREFERRED EMBODIMENTS

Before describing the preferred embodiments, an explanation will be given of the conventional disk drive shown in FIGS. 1A to 2.

Figure 1A:
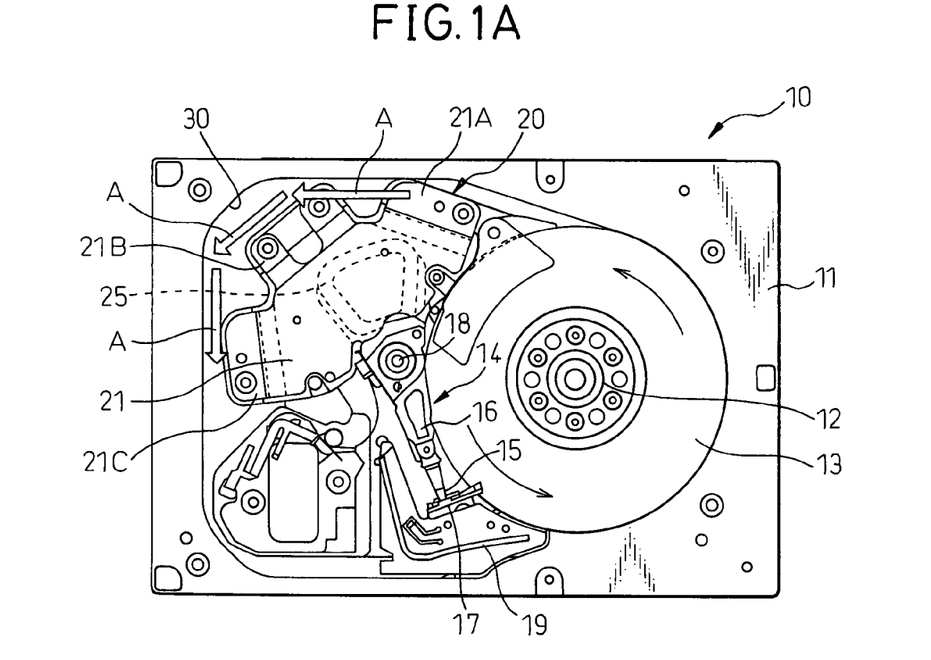
FIG. 1A is a top plan view for explaining a configuration of a conventional magnetic disk device and an airflow generated by the rotation of a disk and flowing within an enclosure.
Figure 2:
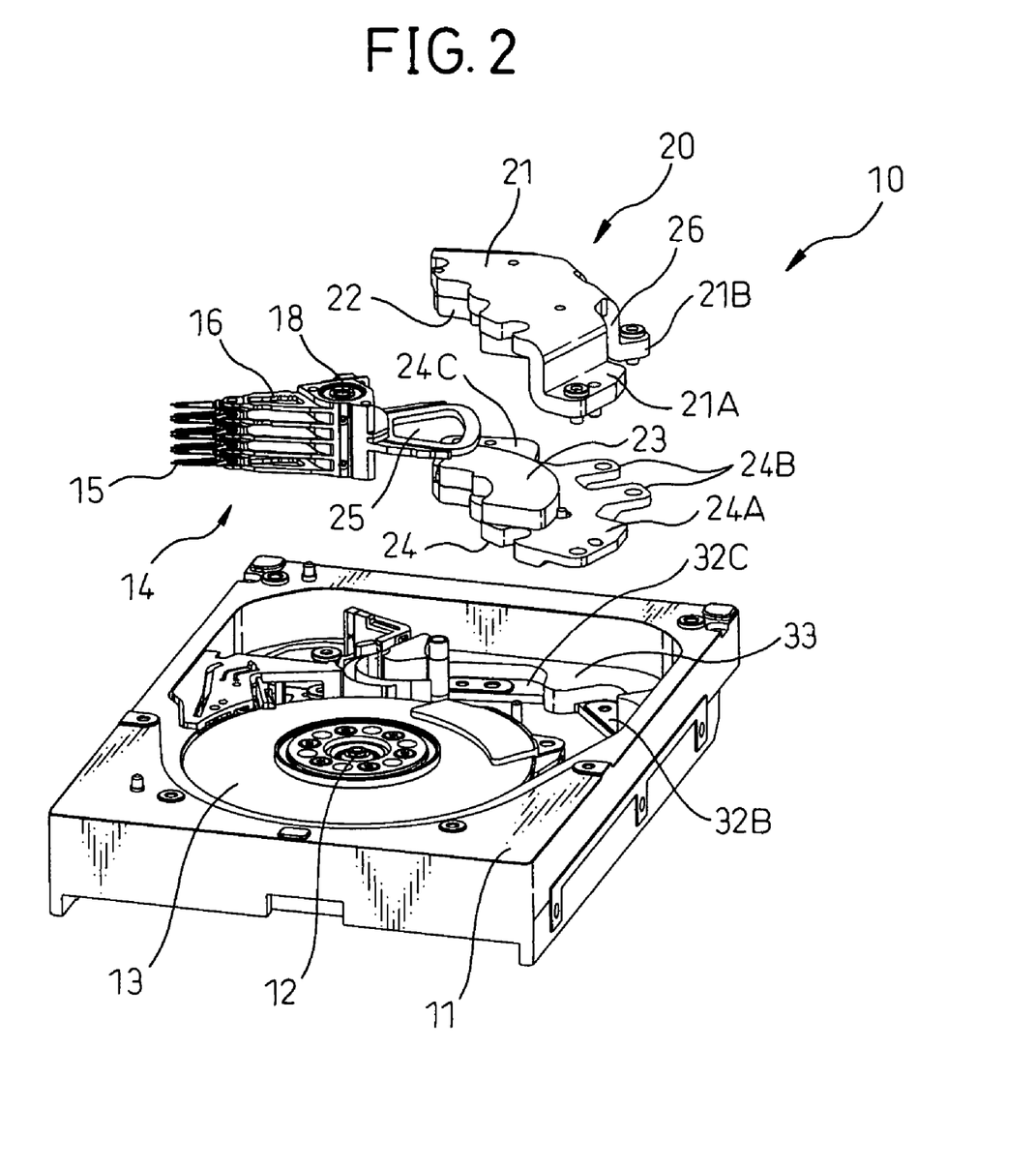
FIG. 2 is an assembly perspective view showing a disassembly of the voice coil motor shown in FIG. 1A.

FIG. 1A and FIG. 2 show configurations of a conventional general magnetic disk device 10. The magnetic disk device 10 includes a spindle motor 12 in an inside 30 of an enclosure 11. At least one magnetic disk 13 is fitted to the spindle motor 12. The magnetic disk 13 stores data on it. A head actuator reads data recorded on the magnetic disk 13 or writes data onto the magnetic disk 13. The head actuator includes a rotation actuator assembly 14, and magnetic heads of head sliders 15 fitted to the front end of the rotation actuator assembly 14. A number of the head sliders 15 is equal to a number of the magnetic disks 13.

Each head slider 15 having a magnetic head is fitted to the front end of an arm member 16, and can move in a radial direction of the disk on the magnetic disk 13. When the magnetic disk device 10 is a load/unload system, the head slider 15 is completely separated (unloaded) from the top of the magnetic disk 13 while the magnetic disk 13 is stationary, and the head slider 15 is held on a ramp at the outside of a recording area at the outermost periphery of the magnetic disk 13. When the magnetic disk 13 rotates, the head slider 15 is loaded on the disk.

The rotation actuator assembly 14 is rotated by a voice coil motor (VCM) 20 around a rotation axis 18. As shown in FIG. 2, the voice coil motor 20 includes an upper yoke 21, an upper magnet 22, a lower magnet 23, a lower yoke 24, and a coil 25 disposed between the upper magnet 22 and the lower magnet 23. The upper yoke 21 is fitted to the upper magnet 22, and the lower magnet 23 is fitted to the lower yoke 24. The coil 25 is fitted to the rotation axis 18 at the opposite side of the arm member 16 of the rotation actuator assembly 14. A distance between the upper magnet 22 and the lower magnet 23 is larger than a thickness of the coil 25. When a current is conducted to the coil 25, the rotation actuator assembly 14 swings around the rotation axis 18.

The upper yoke 21 has three fitting parts 21A, 21B, and 21C, and the lower yoke 24 also has three fitting part 24A, 24B, and 24C at the same corresponding positions. The upper yoke 21 and the lower yoke 24 are fastened and fixed together, with bolts or screws, to yoke fitting parts 32A, 32B, and 32C provided on the bottom of the enclosure 11. The yoke fitting parts 32A, 32B, and 32C provided on the bottom of the enclosure are one stage higher than the bottom of the enclosure 11, and are lower than a stage 33 formed around the bottom of the enclosure 11.

The above heights are differentiated for the following purpose. When the fitting parts 21A, 21B, and 21C of the upper yoke 21 and the fitting parts 24A, 24B, and 24C of the lower yoke 24 are fastened and fixed together, with bolts or screws, to the yoke fitting parts 32A, 32B, and 32C provided on the bottom of the enclosure 11, the surfaces of the fitting parts 21A, 21B, and 21C of the upper yoke 21 become the same height as that of the stage 33. A gap 26 is formed between the adjacent fitting parts 21A, 21B, and 21C of the upper yoke 21.

In the magnetic disk device 10 having the above configuration, when the magnetic disk 13 rotates at a high speed in a direction shown by an arrowhead in FIG. 1A, an airflow is generated in the inside 30 of the enclosure 11 following this rotation. Air flows in a direction shown by an outline arrowhead A along the inner wall of the enclosure 11. This airflow A gradually becomes weak, circulates the inside 30 of the enclosure 11, passes a circulation filter 19, and enters the magnetic disk 13 side.

Figure 1B:
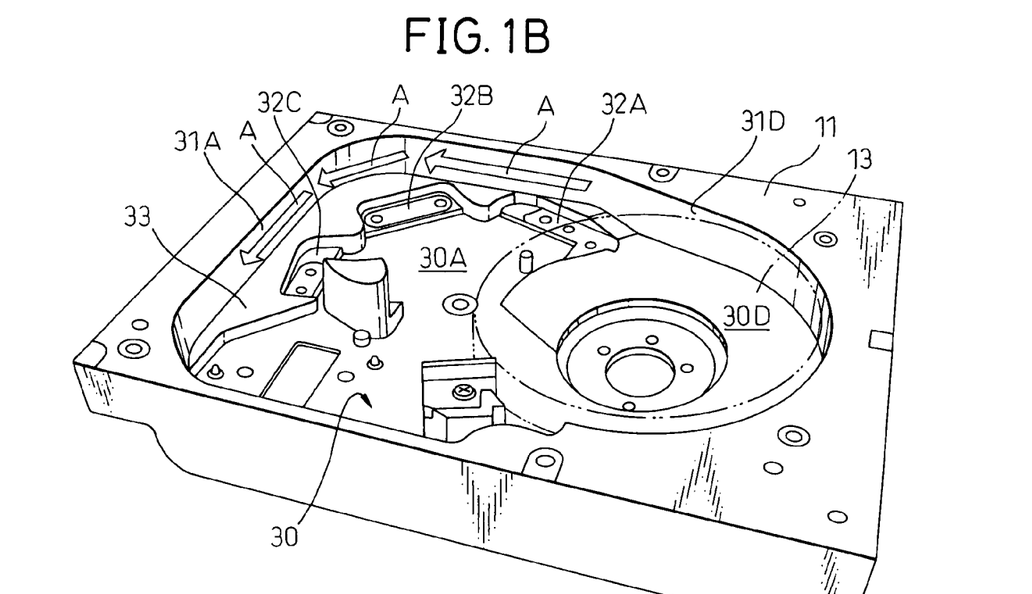
FIG. 1B is a perspective view showing only an airflow generated by the rotation of the magnetic disk, with all parts removed from the inside of the enclosure of the magnetic disk device shown in FIG. 1A.

FIG. 1B shows a state that all parts are removed from the inside 30 of the enclosure 11, to facilitate the understanding of the airflow in the inside 30 of the enclosure 11. In the inside 30 of the enclosure 11, there are an actuator accommodating unit 30A that accommodates the rotation actuator assembly 14 and the voice coil motor 20, and a disk accommodating unit 30D that accommodates the magnetic disk 13, with slight gap left between the magnetic disk 13 and the actuator accommodating unit 30A.

In the disk accommodating unit 30D, the airflow A generated by the high-speed rotation of the magnetic disk 13 enters the actuator accommodating unit 30A from the disk accommodating unit 30D. Because hurdles such as the upper yoke 21 of the voice coil motor 20 are present in the actuator accommodating unit 30A, the airflow A entering the actuator accommodating unit 30A passes along inner walls 31D and 31A of the enclosure 11, as shown in FIG. 1B.

As described above, when the rotation actuator assembly 14 is made to swing around the rotation axis 18 by conducting a current to the coil 25, the coil 25 is heated. Therefore, the coil 25 needs to be cooled by the airflow A generated by the rotation of the magnetic disk 13. According to the data storage device and the hard disk drive described in JP-A-11-110960, a groove is formed on the cavity wall of the disk device, or an isolation disk wall having an airflow channel formed therein is inserted to guide an airflow generated by the rotation of the disk through this airflow channel, thereby cooling the coil.

In other words, according to the data storage device and the hard disk drive described in JP-A-11-110960, a sidewall corresponding to the disk accommodating unit 30D shown in FIG. 1B of the present invention is extended to the actuator accommodating unit 30A side as far as possible along the external periphery of the disk. A groove is formed on this extension part, or a recess is provided at the center of a resin-made shroud insert fitted to the end (a downstream side of the airflow) of the extension part. The airflow is guided to the coil through the groove or the recess, thereby cooling the coil.

However, when a groove is formed on the cavity wall of the disk device, or when a shroud insert having an airflow path is inserted as proposed in the data storage device and the hard disk drive described in JP-A-11-110960, the air inflow is small, and the airflow cannot be efficiently applied to the most heated end part of the coil. Therefore, this method has a problem that the effect of cooling the coil is small. This is because the inner wall of the enclosure is stretched to the inside of the enclosure along the external periphery of the disk, and the airflow generated by the rotation of disk is directed to the inside of the enclosure. Consequently, the airflow cannot easily reach the end part of the VCM coil disposed near the outside of the enclosure.

There is also a method of cooling the coil by guiding the airflow generated by the rotation of the disk to the coil part of the voice coil motor, based on the shape of the magnetic circuit of the voice coil motor. According to this method, the airflow not contributing to the cooling is interrupted, and the amount of the airflow to a circulation filter provided in the downstream decreases. As a result, the dust purge performance decreases.

The present invention solves the above problems of the conventional magnetic disk device. Embodiments of the present invention are explained in detail below based on concrete examples with reference to the accompanying drawings. Constituent members that are the same as the members constituting the conventional disk device are assigned with like reference numerals. A magnetic disk device such as a hard disk device is explained as a disk device.

Figure 3A:
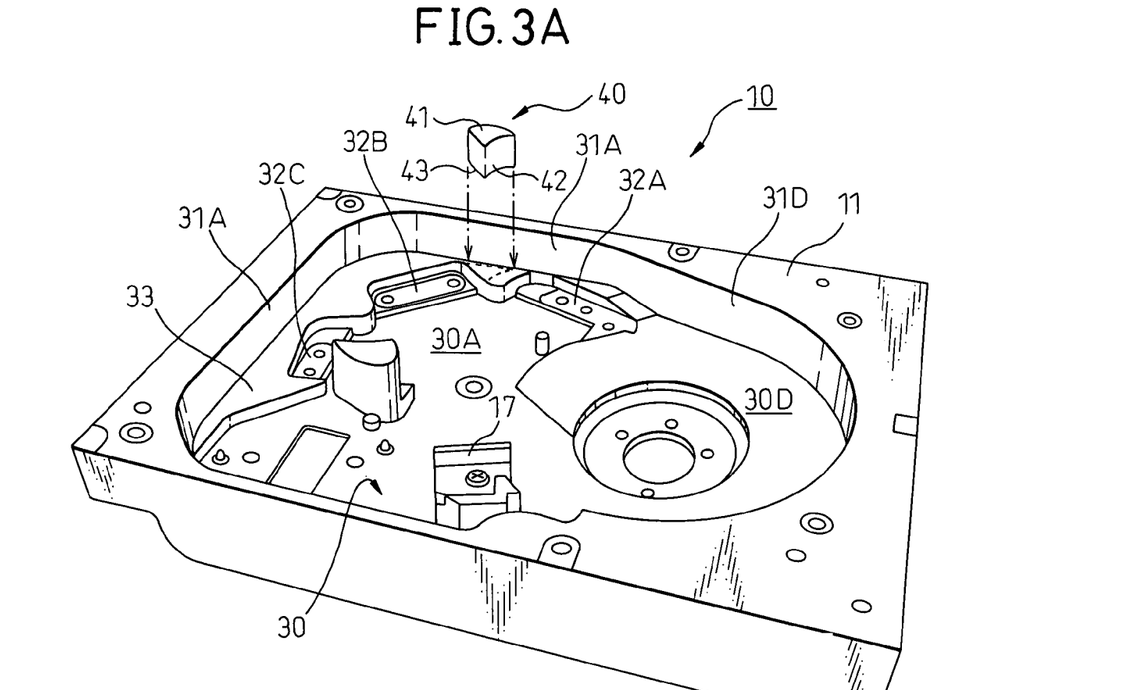
FIG. 3A is a perspective view showing an airflow dividing member fitted to an enclosure and its fitting position of a magnetic disk device according to a first embodiment of the present invention.

FIG. 3A shows a state that all parts are removed from the inside 30 of the enclosure 11 of the magnetic disk device 10 according to a first embodiment of the present invention. In the inside 30 of the enclosure 11, there are the actuator accommodating unit 30A that accommodates the rotation actuator assembly 14 and the voice coil motor 20, and the disk accommodating unit 30D that accommodates the magnetic disk 13, with slight gap left between the magnetic disk 13 and the actuator accommodating unit 30A.

The yoke fitting parts 32A, 32B, and 32C for fitting the fitting parts 21A, 21B, and 21C of the upper yoke 21 and the fitting parts 24A, 24B, and 24C of the lower yoke 24 shown in FIG. 2 are present on the bottom of the actuator accommodating unit 30A. The yoke fitting parts 32A, 32B, and 32C are one stage higher than the bottom of the enclosure 11. The stage 33 which is one stage higher than the yoke fitting parts 32A, 32B, and 32C is formed at both adjacent sides of the yoke fitting parts 32A, 32B, and 32C.

As described above, the airflow generated in the disk accommodating unit 30D passes on the stage 33 from the inner wall 31D of the disk accommodating unit along the inner wall 31A of the actuator accommodating unit. According to the first embodiment of the present invention, an airflow dividing member 40 that divides the airflow is fitted to the stage 33 positioned between the yoke fitting units 32A and 32B. The airflow dividing member 40 has an upper surface 41 and a bottom surface 43. A part of a side surface of the airflow dividing member 40 becomes an airflow dividing surface 42. The airflow dividing surface 42 is an inward curved surface, and divides the air flowing along the inner wall 31A to an inside direction of the enclosure 11.

A height of the upper surface 41 of the airflow dividing member 40 from the bottom surface of the actuator accommodating unit 30A is a highest position of the magnetic circuit gap part of the actuator accommodating unit 30A from the bottom surface, that is, a position of the lower surface of the upper magnet 22 shown in FIG. 2. This height is set to guide the airflow divided by the airflow dividing member 40 to a part between the upper yoke and the lower yoke of the voice coil motor, preferably, to a part between the upper magnet and the lower magnet. Based on this configuration, the airflow dividing member 40 can divide only a part of the airflow passing on the stage 33 along the inner wall 31A of the actuator accommodating unit, without completely interrupting the airflow. The height of the upper surface 41 of the airflow dividing member 40 from the bottom surface of the actuator accommodating unit 30A can be determined by considering a balance between the effect of cooling the coil and the performance of the circulation filter.

While the airflow dividing member 40 made of a separate material can be manufactured using resin as an optimum material, this airflow dividing member 40 can be also manufactured by extruding a metal material such as aluminum and cutting this molded product. This airflow dividing member 40 is fitted to a position indicated by broken lines on the stage 33 shown in FIG. 3A. The airflow dividing member 40 can be fitted to the stage 33 by adhesion using an adhesive or a double-face adhesive tape, or can be fixed by screws. Alternatively, a positioning pin or a positioning hole is provided on the stage 33, and the airflow dividing member 40 is engaged with this pin or hole.

Figure 3B:
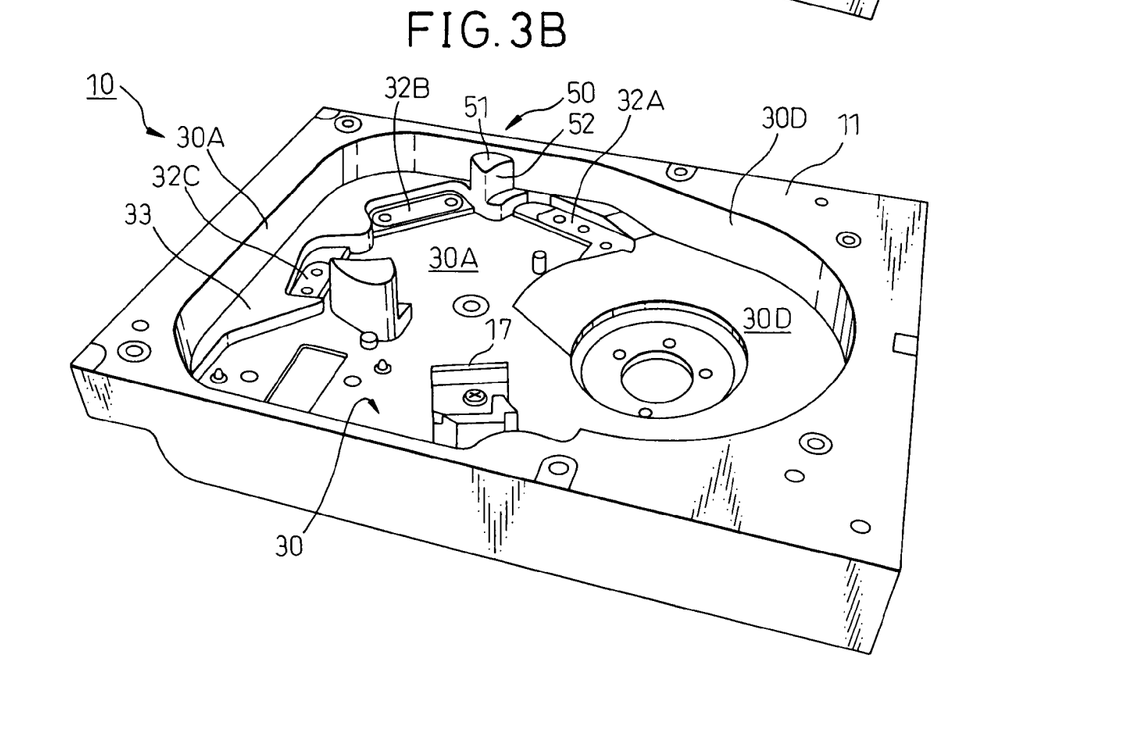
FIG. 3B is a perspective view of an enclosure formed with an airflow dividing projection of a magnetic disk device according to a second embodiment of the present invention.

FIG. 3B shows the magnetic disk device 10 according to a second embodiment of the present invention. FIG. 3B also shows a state that all parts are removed from the inside 30 of the enclosure 11, like FIG. 3A. According to the first embodiment explained with reference to FIG. 3A, the airflow dividing member 40 made of a separate material is fitted to the stage 33 of the inside 30 of the enclosure 11. On the other hand, according to the second embodiment, a part of the enclosure is swollen out at a position of fitting the airflow dividing member 40 according to the first embodiment, thereby providing an airflow dividing projection 50. The airflow dividing projection 50 has an upper surface 51 and a side surface, and a part of the side surface becomes an airflow dividing surface 52. The airflow dividing surface 52 has an inward recessed curve surface, and the airflow passed along the inner wall 31A is divided to an internal direction of the enclosure 11.

Figure 4A:
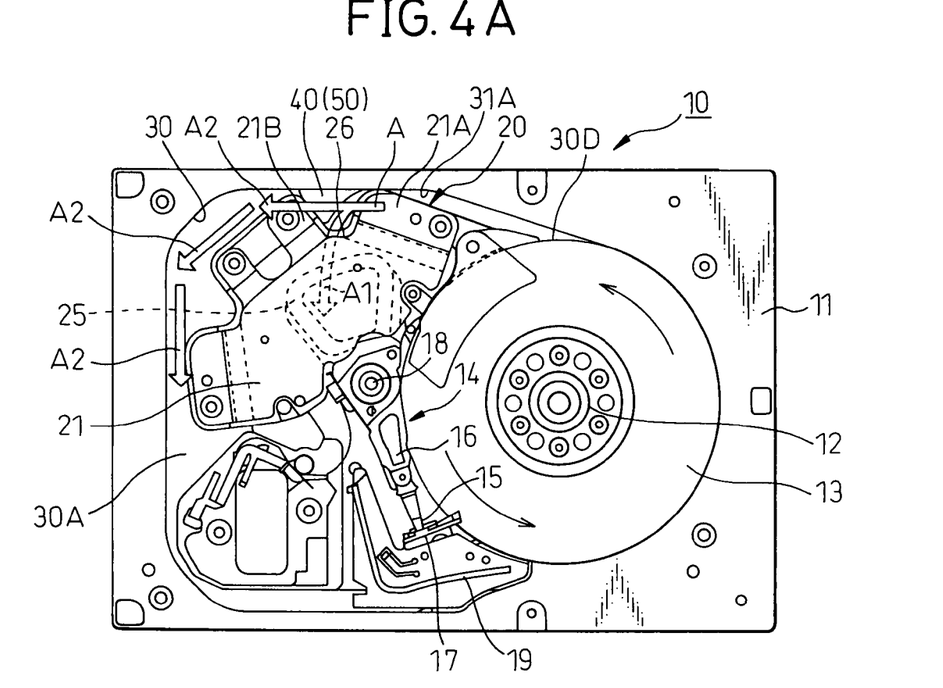
FIG. 4A is a top plan view showing a state of the airflow within a magnetic disk device having the airflow dividing member shown in FIG. 3A or the airflow dividing projection shown in FIG. 3B according to the present invention.
Figure 4B:
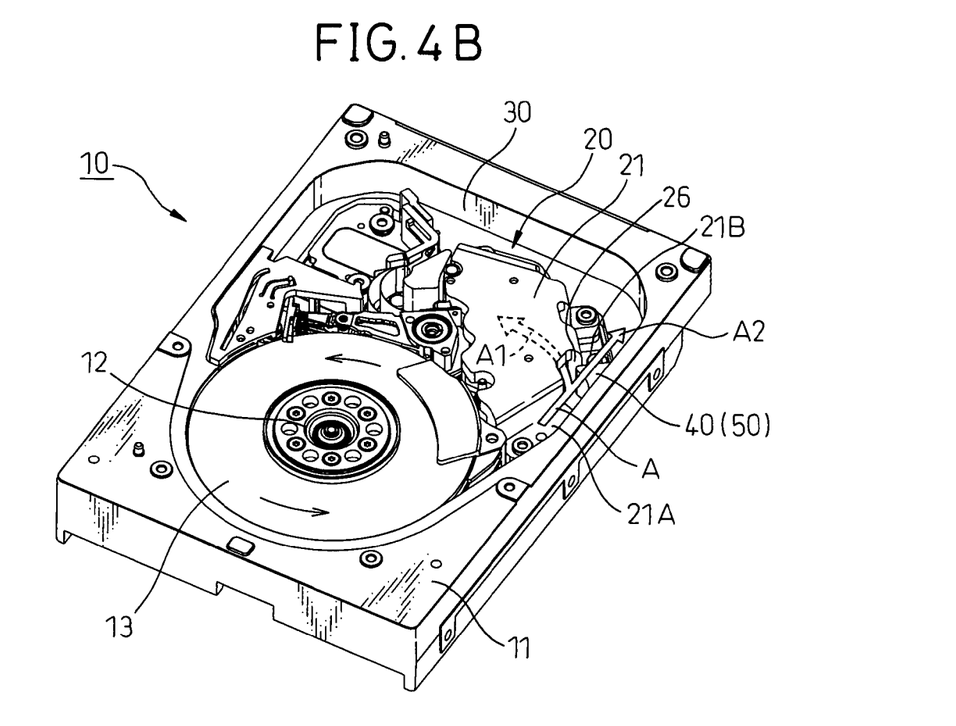
FIG. 4B is a perspective view of the magnetic disk device shown in FIG. 4A.

FIG. 4A is a top plan view of the magnetic disk device 10 having the airflow dividing member 40 shown in FIG. 3A or the airflow dividing projection 50 shown in FIG. 3B. FIG. 4B is a perspective view of the magnetic disk device 10 shown in FIG. 4A. FIG. 4A and FIG. 4B show a state that the airflow A generated by the rotation of the magnetic disk 13 is divided by the airflow dividing material 40 or the airflow dividing projection 50.

The airflow A generated by rotating the magnetic disk 13 in a direction indicated by an arrowhead enters the actuator accommodating unit 30A from the disk accommodating unit 30D. The disk accommodating unit 30D and the actuator accommodating unit 30A are smoothly connected. Therefore, the airflow A from the disk accommodating unit 30D enters the actuator accommodating unit 30A along the inner wall 31A of the actuator accommodating unit.

The airflow A passing along the inner wall 31A of the actuator accommodating unit collides against the airflow dividing member 40 or the airflow dividing projection 50, and a part of the airflow is divided by the airflow dividing surface 42 or 52 and becomes a divided airflow A1. The divided airflow A1 enters the upper yoke 21 from the gap 26 between the fitting units 21A and 21B of the upper yoke 21, and cools the coil 25 of the voice coil motor 20, particularly the end part of the coil 25. The airflow A passing above the airflow dividing surface 42 or 52 directly becomes a main airflow A2. The main airflow A2 circulates within the actuator accommodating unit 30A along the inner wall 31A of the actuator accommodating unit.

As described above, the airflow A is divided by the airflow dividing member 40 or the airflow dividing projection 50. The divided airflow cools the coil 25 of the voice coil motor 20 to lower the temperature of the coil to about 20 degrees centigrade. In general, when a configuration of substantially interrupting the airflow A generated by the rotation of the magnetic disk 13 is applied to the inner wall surface of the enclosure 11, the flow volume of air through the circulation filter 19 positioned in the downstream of the circulation flow decreases. However, according to the present embodiment, only the part of the airflow contributing to the cooling of the coil 25 of the voice coil motor 20 is divided. Therefore, degradation of the performance of the circulation filter 19 is limited to five percent, and this does not substantially degrade the dust purge performance.

Figure 5A:
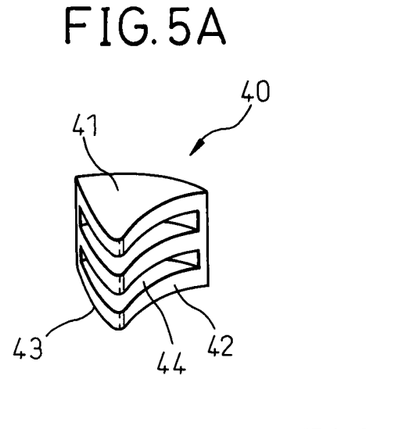
FIG. 5A is a perspective view showing another configuration of the airflow dividing member shown in FIG. 4A of a magnetic disk device according to a third embodiment of the present invention.
Figure 5B:
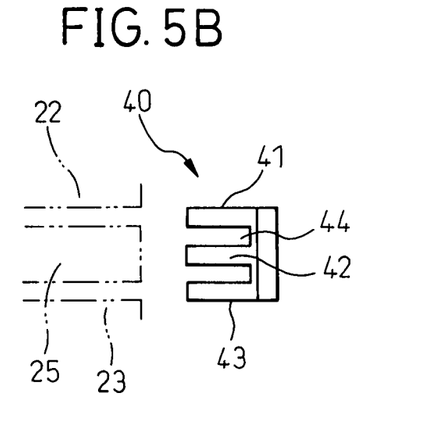
FIG. 5B is a side view of the airflow dividing member shown in FIG. 5A.

FIGS. 5A and 5B are perspective views of other configurations of the airflow dividing member 40 shown in FIG. 3A used in the magnetic disk device according to a third embodiment of the present invention. The airflow dividing member 40 according to the third embodiment has grooves 44 parallel with the upper surface 41 and the lower surface 43, between the upper surface 41 and the lower surface 43 of the airflow dividing member 40. In the third embodiment, the height of the upper surface 41 of the airflow dividing member 40 from the bottom surface of the actuator accommodating unit 30A is also the same as the lower surface of the upper magnet 22. The airflow divided by the airflow dividing surface 42 of the airflow dividing member 40 passes through the gap between the upper magnet 22 and the coil 25 and through the gap between the lower magnet 23 and the coil 25.

Figure 5C:
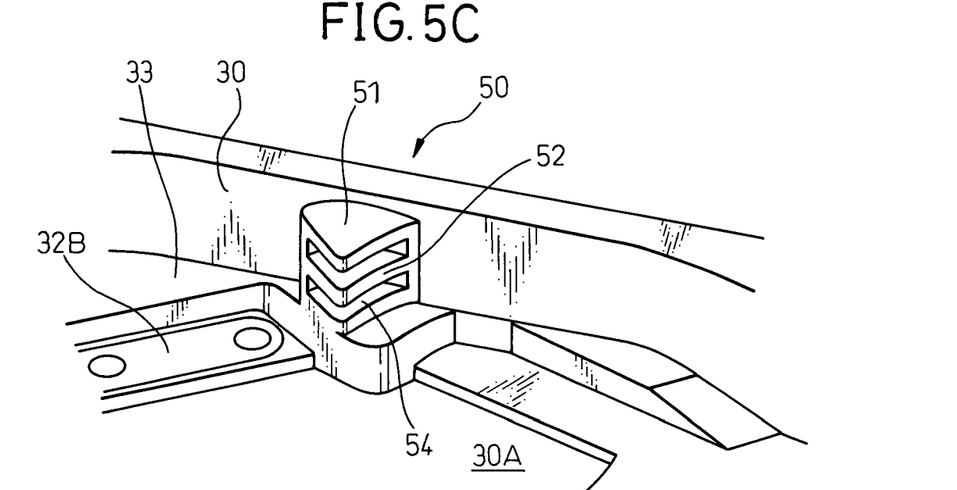
FIG. 5C is a perspective view showing another configuration of the airflow dividing projection shown in FIG. 4B of a magnetic disk device according to a fourth embodiment of the present invention.

FIG. 5C is a perspective view of other configuration of the airflow dividing projection 50 shown in FIG. 3B used in a magnetic disk device according to a fourth embodiment of the present invention. In the fourth embodiment, the grooves 54 parallel with the upper surface 51 are provided on the side surface of the airflow dividing projection 50. In the fourth embodiment, the height of the upper surface 51 of the airflow dividing projection 50 from the bottom surface of the actuator accommodating unit 30A is also the same as the lower surface of the upper magnet 22 shown in FIG. 2. The airflow divided by the airflow dividing surface 52 of the airflow projection 50 passes through the gap between the upper magnet 22 and the coil 25 and through the gap between the lower magnet 23 and the coil 25.

Figure 5D:
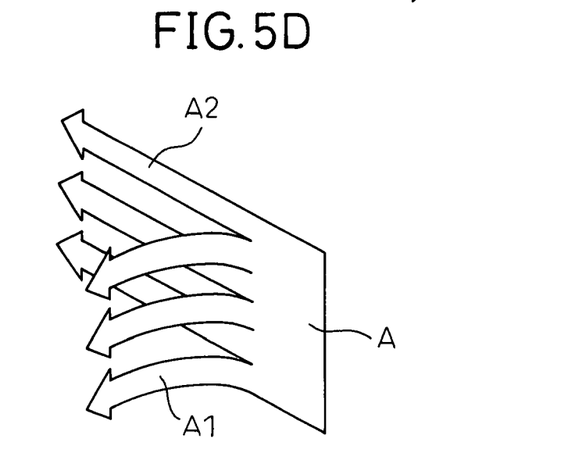
FIG. 5D is an explanatory view of air flowing through the airflow dividing member shown in FIG. 5A or through the airflow dividing projection shown in FIG. 5C.

Based on this configuration, as shown in FIG. 5D, the airflow A passing above the stage 33 along the inner wall 31A of the actuator accommodating unit can be divided into the airflow A1 and the main airflow A2, without completely interrupting the airflow A. Numbers and heights of the grooves 44 and 54 can be determined by considering a balance between the effect of cooling the coil and the performance of the circulation filter.

Figure 6A:
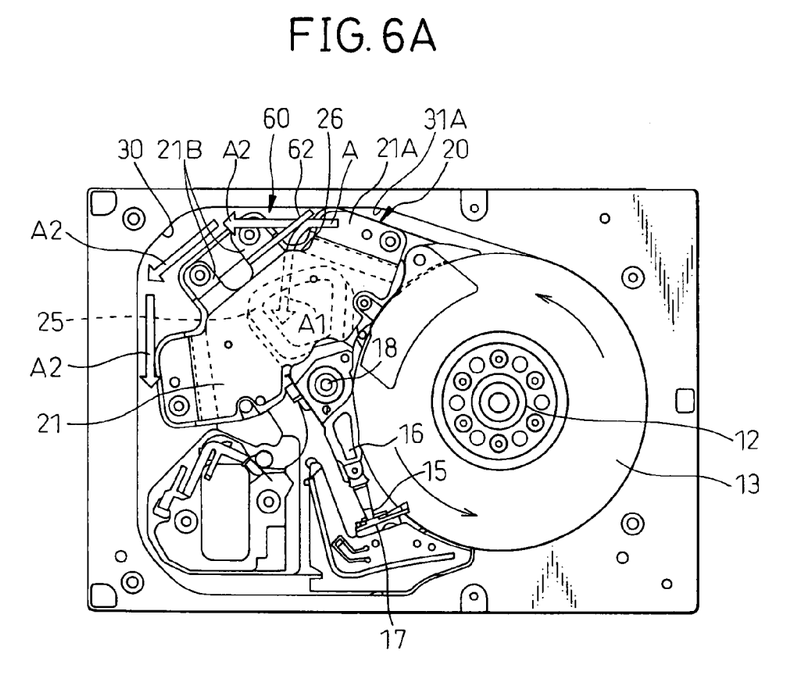
FIG. 6A is a top plan view showing an airflow dividing member fitted to a yoke fitting member of an enclosure and flow of air according to this airflow dividing member of a magnetic disk device according to a fifth embodiment of the present invention.
Figure 6B:
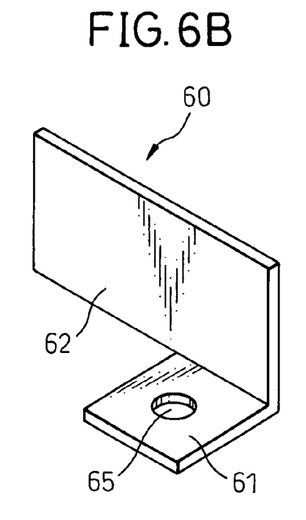
FIG. 6B is a perspective view of the airflow dividing member shown in FIG. 6A.

FIG. 6A shows the magnetic disk device 10 according to a fifth embodiment of the present invention. According to the fifth embodiment, an airflow dividing member 60 of a separate unit as shown in FIG. 6B is fitted to a fitting part 21B nearest to the fitting part 21A of the upper yoke 21 of the voice coil motor 20, out of two fitting parts 21B. The airflow dividing member 60 has a fitting part 61 formed with a fitting hole 65, and an airflow dividing plate 62 is connected to this fitting part 61. In the fifth embodiment, the airflow dividing plate 62 is a flat plate. The airflow dividing member 60 is fixed to the fitting part 21B, by inserting a bolt or a screw for fixing the fitting part 21B of the upper yoke 21 through the fitting hole 65 of the fitting part 61, and fastening the bolt or screw with the fitting part 21B together. A height of the airflow dividing plate 62 from the bottom surface of the enclosure 11 when the airflow dividing member 60 is fixed to the fitting part 21B is the same as the height of the upper surface 51 of the airflow dividing projection 50 according to the second embodiment.

Based on this configuration, the airflow A passing along the inner wall 31A of the actuator accommodating unit collides against the airflow dividing member 60. A part of the airflow A is divided by the airflow dividing plate 62, and becomes the airflow A1. The divided airflow A1 enters the upper yoke 21 from the gap 26 between the fitting parts 21A and 21B of the upper yoke 21, thereby cooling the coil 25 of the voice coil motor 20. The airflow A passing above the airflow dividing plate 62 directly becomes the main airflow A2, and circulates within the actuator accommodating unit 30A along the inner wall 31A of the actuator accommodating unit. A width and a length of the airflow dividing plate 62 can be determined by considering a balance between the effect of cooling the coil and the performance of the circulation filter.

Figure 6C:
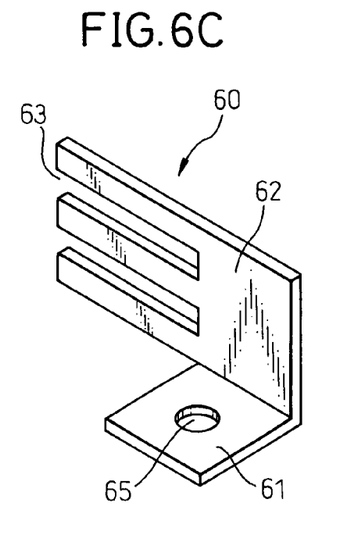
FIG. 6C is a perspective view of an airflow dividing member of a magnetic disk device according to a sixth embodiment of the present invention.

FIG. 6C shows the airflow dividing member 60 of the magnetic disk device 10 according to a sixth embodiment of the present invention. The airflow dividing member 60 according to the sixth embodiment is different from the airflow dividing member 60 according to the fifth embodiment in that slits 63 are provided at the front end of the airflow dividing plate 62. Instead of the slits 63, plural holes can be provided. A width and a length of the slits 63 can be determined by considering a balance between the effect of cooling the coil and the performance of the circulation filter.

Figure 6D:
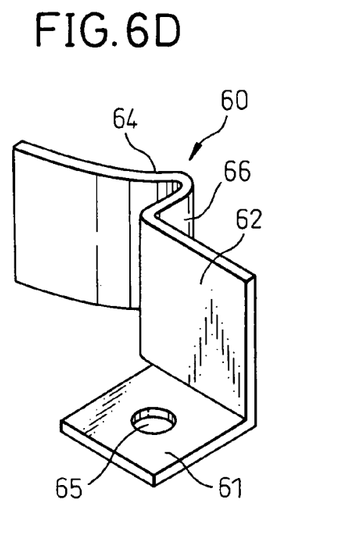
FIG. 6D is a perspective view of an airflow dividing member of a magnetic disk device according to a seventh embodiment of the present invention.

FIG. 6D shows the airflow dividing member 60 of the magnetic disk device 10 according to a seventh embodiment of the present invention. The airflow dividing member 60 according to the seventh embodiment is different from the airflow dividing member 60 according to the fifth embodiment in that the airflow dividing plate 62 has a curved part 64 and a stage 66. A curve shape of the curved part 64 can be similar to that of the airflow dividing surface 40 of the airflow dividing member 40 described above. The shape of the curved part 64 can be also determined by considering a balance between the effect of cooling the coil and the performance of the circulation filter. As a modification of the seventh embodiment, the airflow dividing plate 62 can have plural slits similar to those of the sixth embodiment or through-holes.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of the invention.

What is claimed is:
1. A disk device comprising:
an enclosure which internally includes a disk accommodating unit and an actuator accommodating unit;
at least one disk medium which is accommodated in the disk accommodating unit and is rotated by a spindle motor;
a rotation actuator assembly which is accommodated in the actuator accommodating unit and reads or writes data using a head to the disk medium;
a voice coil motor which is accommodated in the actuator accommodating unit to drive the rotation actuator assembly, and includes an upper yoke, an upper magnet, a lower magnet, a lower yoke, and a coil fitted to the rotation actuator assembly; and an airflow dividing member which is provided near a communicating hole connecting between the inside and the outside of the upper yoke, and divides a part of airflow generated by the rotation of the disk medium and passing along the inner wall of the enclosure, toward the communicating hole.

2. The disk device according to claim 1, wherein
the airflow dividing member is structured as a separate unit from the enclosure, and is fitted to the inner wall of the enclosure.

3. The disk device according to claim 1, wherein
the airflow dividing member is structured integrally with the enclosure, and is formed by having a part of the inner wall of the enclosure swollen out.

4. The disk device according to claim 1, wherein
the airflow dividing member is structured as a separate unit from the enclosure, and is fitted to a fitting part of the enclosure of the upper yoke with the upper yoke, by fastening with the upper yoke.

5. The disk device according to claim 2, wherein at least one groove parallel with the bottom surface of the enclosure is provided on the airflow dividing member.

6. The disk device according to claim 2, wherein
a plurality of through-holes are formed on the airflow dividing member in a direction parallel with the bottom surface of the enclosure.

7. The disk device according to claim 1, wherein
the airflow dividing member is formed on a stage provided around the bottom surface of the enclosure.

8. The disk device according to claim 1, wherein
a height of a portion between a top part and a bottom part of the airflow dividing member from the bottom surface of the enclosure is overlapped with a height of a part between the upper yoke and the lower yoke of the voice coil motor accommodated in the enclosure.

9. The disk device according to claim 4, wherein
the airflow dividing member comprises:
a fitting part which is fastened with a fitting part of the upper yoke to the enclosure; and
an airflow dividing plate structured by a rectangular flat plate which is connected to the fitting part in a direction orthogonal with the fitting part and is extended to a direction away from the fitting part.

10. The disk device according to claim 4, wherein
the airflow dividing member comprises:
a fitting part which is fastened with a fitting part of the upper yoke to the enclosure;
a vertical part which is connected to the fitting part in a direction orthogonal with the fitting part;
a stage having a predetermined length and folded to a direction opposite to the fitting part relative to the vertical part; and
an airflow dividing plate structured by a curved part curved convex to the fitting part side.

11. The disk device according to claim 8, wherein
a height of the top surface of the airflow dividing member from the bottom surface of the enclosure is equal to a height of the bottom surface of the upper magnet fitted to the upper yoke of the voice coil motor accommodated in the enclosure.

* * * * *